United States Patent [19]

Jennings

[11] 4,178,729

[45] Dec. 18, 1979

[54] WALL STRUCTURE FOR A NUCLEAR REACTOR CONTAINMENT HOUSING

[75] Inventor: Ralph L. Jennings, Des Moines, Iowa

[73] Assignee: Economy Forms Corporation, Des Moines, Iowa

[21] Appl. No.: 905,643

[22] Filed: May 15, 1978

[51] Int. Cl.² ............................................... E04B 1/70
[52] U.S. Cl. .................... 52/284; 52/173 R; 52/249; 52/303; 52/375; 250/517
[58] Field of Search ............... 52/302, 303, 378, 584, 52/173, 284, 249, 269; 250/517; 176/87, DIG. 2; 73/40, 49.2; 137/312

[56] References Cited

U.S. PATENT DOCUMENTS

| | | | |
|---|---|---|---|
| 1,576,813 | 3/1926 | Davies et al. | 52/284 X |
| 2,691,134 | 10/1954 | Ford | 73/40 X |
| 3,282,613 | 11/1966 | Axelsonn | 52/584 |
| 3,333,383 | 8/1967 | Raudebaugh, Jr. | 52/584 X |
| 3,490,268 | 1/1970 | Hand et al. | 73/40 |
| 3,995,403 | 12/1976 | Nickell | 52/284 |

FOREIGN PATENT DOCUMENTS

| | | | |
|---|---|---|---|
| 545354 | 8/1956 | Belgium | 52/284 |
| 868527 | 10/1941 | France | 73/40 |
| 718606 | 11/1954 | United Kingdom | 52/249 |

Primary Examiner—Alfred C. Perham
Attorney, Agent, or Firm—Rudolph L. Lowell; G. Brian Pingel

[57] ABSTRACT

A wall structure for a nuclear reactor containment housing or pool is formed by at least two metal concrete forms or panels, each of which has a rectangularly shaped main or base plate of a stainless steel material constituting inner liner portions of the wall structure. Projected laterally from the base plate is a peripheral flange that includes an outer portion, of a dimensional size substantially equal to the dimensional size of the base plate, and an inwardly inclined inner leg portion that is fixed to the base plate inwardly from the side edges of the base plate. An outer portion of the peripheral flange of one of the panels is connectable in a side-by-side relation with an outer portion of the peripheral flange of an other panel whereby to form a channel or passage therebetween of a substantially triangular shaped in cross sectional area defined by adjacent inclined inner leg portions of the peripheral flanges and adjacent side portions of the panel base plates, the edges of which are fluid sealed as by weldments. Any radioactive material that may leak through the fluid sealed edges of the main plates is directed through the wall structure to a leak detection zone.

5 Claims, 8 Drawing Figures

WALL STRUCTURE FOR A NUCLEAR REACTOR CONTAINMENT HOUSING

BACKGROUND OF THE INVENTION

1. Field of the Invention

The present invention relates in general to wall structures for nuclear reactor containment housings or pools and more specifically relates to such wall structures that include interconnected passages located inwardly of a liner for the pool and arranged to direct any leakage through the liner to a leak detecting zone.

2. Description of the Prior Art

The necessity for leak proof containment housings for radioactive materials is well known. Furthermore, it has also been recognized that even though much effort, care and expense is expended in building a containment housing, the possibility of structural leaks developing in the walls thereof cannot be totally eliminated. Consequently, wall structures have been developed for nuclear reactor containment housings to permit a detection of any structural leaks that may develop.

In U.S. Pat. No. 3,288,998, issued Nov. 29, 1966, a containment vessel is disclosed that includes a lining wall having an inner layer and an outer layer. The inner layer is formed from a smooth sheet metal material welded together to form a leak tight barrier. In contrast, the outer layer is formed of a sheet with a plurality of indentations, and the two layers are positioned together so that only the indentations of the outer layer contact the inner layer. Thus, a plurality of connected passages are defined by the two layers throughout the entire area of the lining wall. A pumpback compressor is connected to the passages for drawing air therefrom and supplying it to a radiation detector. Accordingly, when a leak in the lining wall develops, it can be immediately detected.

Although the above structure appears to provide a means for reducing the possibility of damage as the result of radioactive leaks, it has been found unnecessary to monitor the entire area of a lining wall since leaks only develop at the welds or fluid sealed connections of the members forming the liner wall. Accordingly, a need exists for a lining wall that provides for a monitoring of leaks only at the fluid sealed connection in such wall to enable a more effective detecting and localizing of leaks.

SUMMARY OF THE INVENTION

The present invention provides a nuclear reactor containment housing wall structure that is relatively simple in construction and which can be readily assembled to provide a well structure that not only has a liner wall of high fluid sealing integrity, but which includes means for positively detecting any structural leaks that may develop in the liner wall of the structure.

The wall structure of the present invention includes at least two like metal concrete forms or panels, each of which includes a main or base plate having an upstanding lateral peripheral flange. Each flange is formed with an outer portion, and an inwardly inclined inner leg portion. The junctions of the leg portions with the main plates are spaced inwardly from the side edges of a concrete construction.

DESCRIPTION OF THE PREFERRED EMBODIMENT

Figure 1:
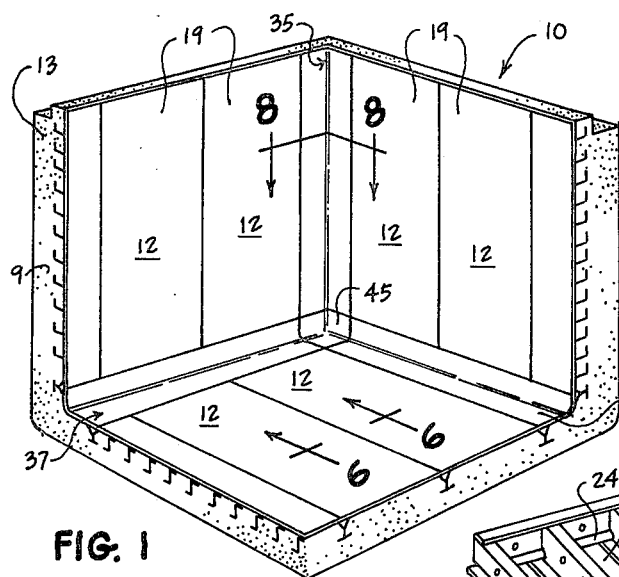
FIG. 1 is a fragmentary perspective of one corner of a spent fuel pool formed by the wall structure of the present invention.

The present invention is adapted for forming a wall structure for a nuclear reactor containment housing and is described herein as forming a pool 10 a corner of which is shown in FIG. 1, for spent radioactive uranium fuel from a nuclear reactor. The spent fuel is stored in rod-shaped cases that are placed in the pool 10 for cooling after being removed from the reactor.

Figure 3:
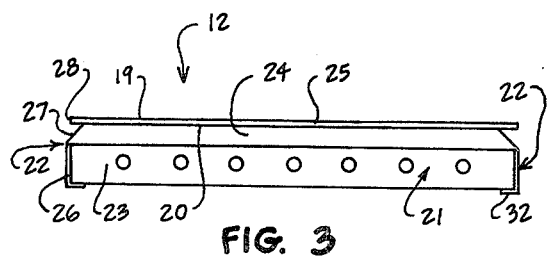
FIG. 3 is an end view of the panel of FIG. 2 in an inverted position.
Figure 2:
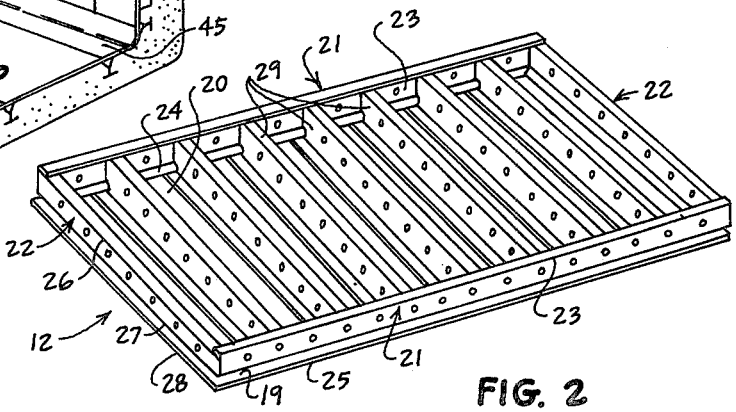
FIG. 2 is a perspective view of a metal form that constitutes the inner lining of the wall structure of the present invention.
Figure 4:
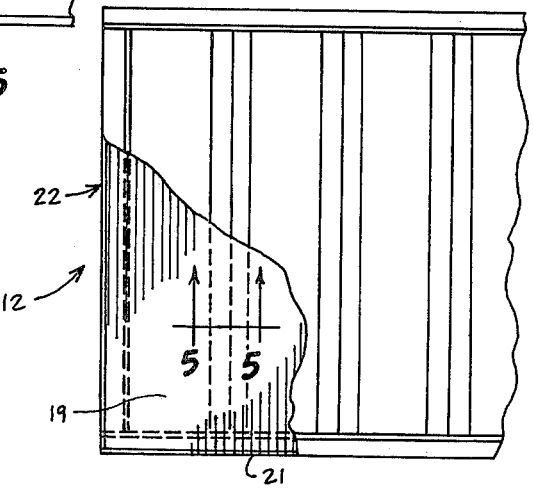
FIG. 4 is a plan view of a part of the form of FIG. 3 with a portion cutaway to expose the interior construction thereof.

A wall structure 13 of the pool 10 is formed by a plurality of metal concrete forms 12 having base plates that serve as an inner lining for the wall 13. The forms 12 are also utilized in constructing an outer concrete section 9 of the pool wall 13. Referring to FIGS. 2-4, each of the forms 12 includes a rectangularly shaped main or base plate 19 of a stainless steel material.

An upstanding or laterally extended peripheral flange projects from one surface 20 of the base plate 19 and includes longitudinal side sections 21 and end sections 22. Each of the flange side sections 21 includes an outer portion 23 arranged in a plane normal to the main plate 19 at a side edge 25 thereof and an inwardly inclined inner leg portion 24 that is joined, as by welding, to the surface 20 of the main plate inwardly from the side edge 25 of the main plate 19. The end flange sections 22 are shaped similar to the flange side sections 21 and include outer portions 26 normal to the main plate 19 at the end edges 28 thereof and inwardly inclined inner leg portions 27 connected to the plate 19 inwardly from the end edges 28.

Figure 5:
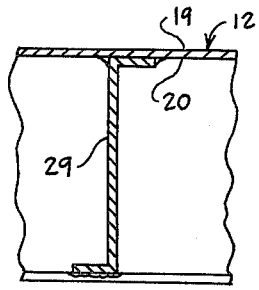
FIG. 5 is a sectional view taken along line 5—5 of FIG. 4.

The exterior surfaces of the flange sections 21 and 22 lie in planes located outwardly from the planes of the base plate side and end edges 25 and 28, respectively, for a purpose to appear later. Longitudinally spaced transverse rib members 29 extend between and are secured to the flange side sections 21. As shown in FIG. 5, the rib members 29 are arranged within the dimensional confines of the peripheral flange.

Figure 6:
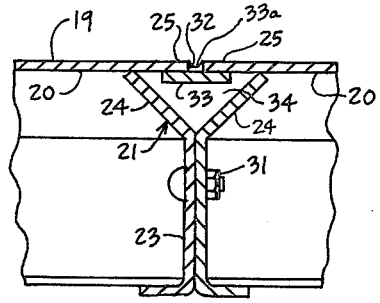
FIG. 6 is a sectional view taken along line 6—6 of FIG. 1.
Figure 7:
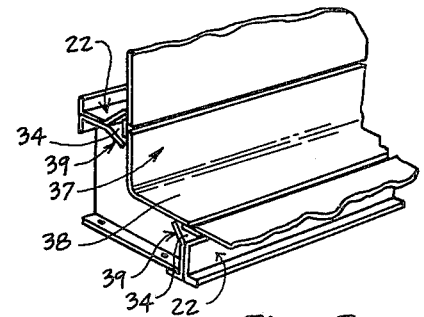
FIG. 7 is a detail perspective view showing a coving form for interconnecting the metal forms of the wall structure and floor of the containment pool.

When two forms 12 are to be connected together in a side-by-side relation, as illustrated in FIG. 6, the outer portions 23 of the flange side sections 21 are arranged in a back to back relation for securement by bolt assemblies 31. Since the side edges 25 of the base plate 19 do not extend beyond the outer surfaces of the outer flange side sections 21, a gap 32 is formed between the adjacent side edges 25 of adjacent forms 12. This gap 32 is fluid sealed by initially spot welding a steel strap member 33 to the surface 20 of one of the forms 12 at a position near the side edge 25 thereof such that the strap member 33 extends across the gap 32. After the two forms 12 are secured together, the gap 32 is fluid sealed by welding together the side edges 25 of the adjacent base plates 19 by a weldment 33a. During the welding operation, the strap member 33 serves as a back or stop plate for confining the weldment 33a within the gap 32.

When two forms 12 are bolted together and the gap 32 is fluid sealed, as described above, a channel 34 is formed by the inner leg portions 24 and the main plate side edges 25. This channel 34 runs the entire length of the forms 12 and functions as a conduit for funneling to a monitored detection zone any pool liquid that may leak through the weldment 33a. A similar type channel is formed when two of the forms 12 are bolted together in an end-to-end relation. As a result, when a plurality of forms 12 are connected together, such that one thereof is located centrally of adjacent forms 12, a continuous series of channels 34 will extend peripherally about the central form.

Figure 8:
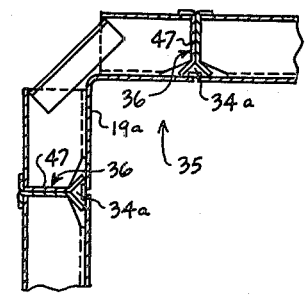
FIG. 8 is a sectional view as seen along line 8—8 of FIG. 1.

Referring again to FIG. 1, each panel or form 12 of the pool wall 13 is connected to an adjacent panel 12 at their side flange sections 21. The forms 12 at a corner of the pool wall 13 are interconnected by a corner form 35 (FIGS. 1 and 8) having a base plate 19a of a stainless steel construction and side flanges 36 connectible with the side flanges 21 of the forms 12 to form channels 34a, in the manner previously described for the channels 34. The forms 12, forming the floor of the pool 10, are interconnected with the wall forms 12 by curved cove forms 37 having a stainless steel base plate 38 and side flanges 39 connectible with the end flanges 22 of the panels 12 to form channels 34 therewith. As a result, any fluid leakage through the weldments 33a connecting the forms 12, 35 and 37 is directed through certain of the channels 34 and 34a to a radiation detecting monitor zone.

Because a plurality of passages 34 and 34a are interconnected in the pool wall 13, detection of fluid at a monitoring zone does not provide information about the specific location of the leak. Therefore, when a leak develops and is noted by the detection of fluid at the monitoring zone, pressurized air is pumped into the network of channels 34 and 34a. As this air escapes through the leak in a weldment 43, the location of the leak is readily detected.

Thus, the present invention provides a wall structure for a nuclear containment pool which can be readily assembled to provide an integral stainless steel inner lining for the pool wall 13 concurrently with providing means for quickly detecting any leaks that may occur at defined locations in the inner lining. Although the invention is described as forming a spent fuel pool, the invention may also be employed for forming various other types of nuclear wall structures wherever the escape of a liquid radioactive material is to be detected.

Further, although the invention has been described with respect to a preferred embodiment thereof, it is to be understood that it is not to be so limited since changes and modifications can be made therein which are within the full intended scope of this invention as defined by the appended claims.

I claim:

1. A wall structure for a nuclear reactor containment housing comprising:
    (a) at least two metal concrete form panels each of which include:
        (1) a rectangularly shaped main plate having side edges and end edges,
        (2) a laterally extended flange about the periphery of said main plate, said flange having an outer portion and an inwardly inclined inner leg portion connected with said main plate inwardly from the side edges and end edges thereof,
    (b) means for connecting said two form panels together at the outer portions thereof such that when said forms are connected together at the outer portions thereof adjacent side edges are in a closely spaced relation,
    (c) a liquid tight seal between adjacent ones of said side edges.

2. A wall structure for a nuclear reactor containment housing according to claim 1, wherein said forms are interconnected by a metal concrete corner form comprising:
    (a) an angle shaped in cross section main plate having side edges,
    (b) a laterally extended flange about the periphery of said main plate, said flange having an outer portion and an inwardly inclined inner leg portion connected with said main plate inwardly from the side edges thereof,
    (c) means for connecting the outer portions of said corner form with the outer portions of two of said form panels such that when said corner form and said form panels are connected together at the outer portions thereof, adjacent side edges of said form and panels are in a closely spaced relation,
    (d) a liquid tight seal between adjacent ones of said side edges.

3. A wall structure for a nuclear reactor containment housing according to claim 1, wherein said form panels further comprise:
    (a) a plurality of spaced-apart, traverse support ribs extend between portions of said flange.

4. A well structure for a nuclear reactor containment housing according to claim 1, wherein:
    (a) said outer portions of said peripheral flange of each of said form panels have exterior surfaces in planes normal to the plane of said main plate.

5. A well structure for a nuclear reactor containment housing comprising:
    (a) a plurality of metal, concrete form panels each of which includes:
        (1) a rectangularly shaped main plate having side edges and end edges,
        (2) a laterally extended flange about the periphery of said main plate, said flange having an outer portion lying in a plane perpendicular to said main plate, and an inwardly inclined inner leg portion connected with said main plate inwardly from the side edges of said plate,
    (b) means for connecting a plurality of said forms together at the outer portions thereof such that when said form panels are connected together, adjacent side and end edges are in a closely spaced relation and said connected outer portions are in an abutting engagement,
    (c) a liquid tight seal between adjacent ones of said side edges and said end edges.

* * * * *